May 20, 1941.　　　　J. J. STANKO　　　　2,242,443
PREPARATION OF ROOFING GRANULES AND THE LIKE
Filed Oct. 18, 1938
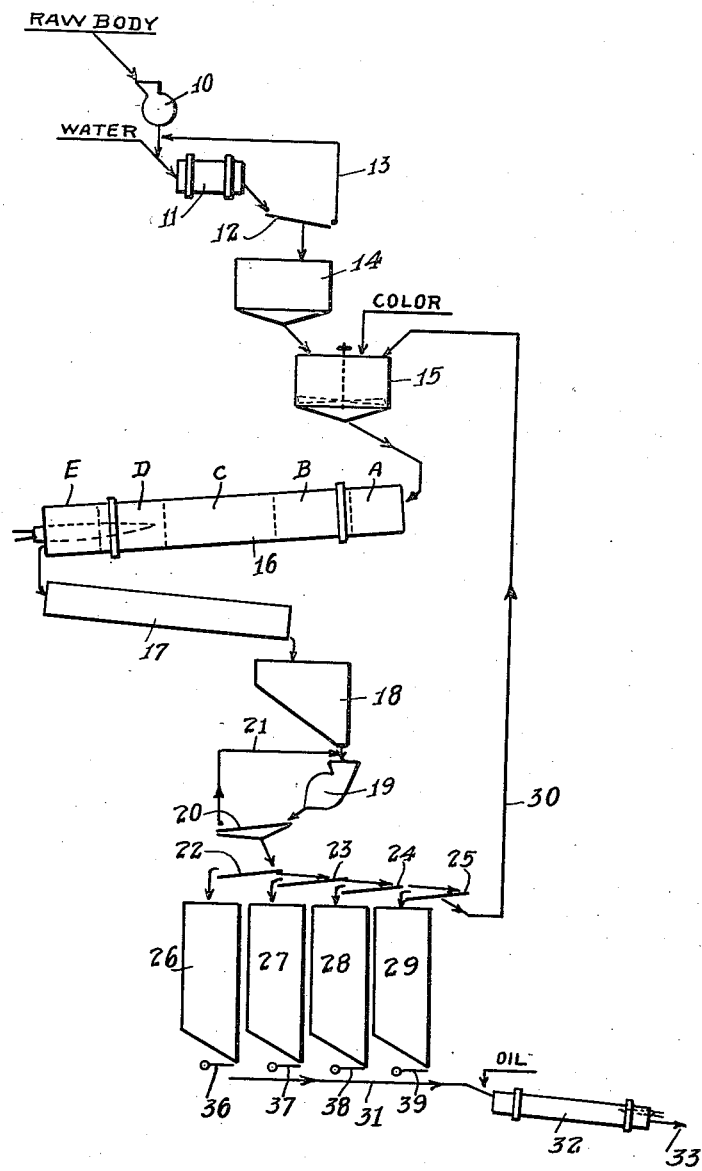
John J. Stanko, Inventor
By Lyon & Lyon, Attorneys Patented May 20, 1941

2,242,443

UNITED STATES PATENT OFFICE 2,242,443

PREPARATION OF ROOFING GRANULES AND THE LIKE

John J. Stanko, San Pedro, Calif., assignor to American Mineral Company, San Pedro, Calif., a corporation of California Application October 18, 1938, Serial No. 235,601

5 Claims. (Cl. 25—156)

This invention relates to methods of preparing substantially vitrified ceramic products in granular form. Ceramic granules such as are manufactured by the method of this invention, are particularly well adapted for use in the structural arts, for example, in mosaics, as facing material for building blocks, tile, etc., and as a surfacing material for concrete in architectural work. The granules of this invention can be provided with a desired color extending throughout each particle, thereby permitting the granules to be effectively used in architectural work whereas previously manufactured granules were only surface coated and were not suitable. They are also used for surfacing bituminous roofings, and wherever a strong, dense, substantially non-porous granular material can be utilized to advantage. In view of the strength and insolubility of the granules, they are adapted for use in filter beds, can be placed in well hole cavities to hold back shifting sands and still permit free percolation of oil, and for many other purposes in numerous industries. The method of this invention, furthermore, assures the production of granules of any desired color, the color being an integral part of the granule so that surface wear does not destroy the beauty or utility of the granule.

Commercial manufacture of substantially vitrified ceramic granules has developed extensively in recent years but methods of manufacture heretofore employed did not result in granular products having a sufficiently high strength nor a desired configuration or surface texture. Moreover, prior methods of manufacture involved numerous handlings and manipulations, thereby increasing the cost of the granular material to beyond truly economic limits.

The present invention is directed to a process of manufacturing virtually vitrified ceramic material in granular form, the method being continuous and obviating the necessity of the many handlings and manipulations which characterize prior processes. The method herein disclosed may be said to be an improvement over that defined in the Brown Patent No. 2,007,742. In such prior method a mixture of ceramic ingredients in finely divided form was filtered and then formed into particles by means of an extrusion machine or breaking and cutting apparatus. This material was then screened and burned.

The present invention contemplates the formation of a slurry containing a ceramic material in finely divided form. Coloring oxides and other pigments may be added directly to the slurry. The slurry is then continuously fed into a rotary kiln so as to form a pool of slurry in the feed end of the kiln. By controlling the per cent of water in the slurry thus fed to the kiln it is possible to regulate, within limits, the average size of the granular material discharged from the kiln.

Prior processes required the use of plastic ceramic mixtures but the present invention permits the use of non-plastic ceramic bodies, thereby permitting the production of a more refractory and stronger granule. When more plastic bodies are employed, a reduction in amount of dust loss has been observed. Since, in accordance with this invention, the size of the vitrified granule discharged by the kiln may be controlled to a material extent by regulating the water content of the slurry, it is possible to produce a relatively large proportion of granules of the size actually required by the trade without the necessity of crushing or grinding the vitrified material. The particles themselves are not smooth-surfaced but instead the uncrushed particles are provided with a pimply surface which facilitates anchorage of the particles in whatever cementitious material is used as a bond during the utilization of the final product.

It is an object of this invention, therefore, to provide a rapid and economical method of manufacturing virtually vitrified ceramic granules.

Another object is to provide a continuous method of manufacturing virtually vitrified ceramic granules.

Another object is to provide a continuous method of manufacturing vitrified granules from non-plastic ceramic materials, the resulting granules being characterized by high strength and very low absorption.

A still further object of the invention is to provide a method of producing substantially vitreous ceramic material in granular form, the surfaces of the uncrushed particles having a bumpy or pimply surface.

These and other objects and advantages of this invention will become apparent to those skilled in the art from the following detailed description of a preferred method of performing the process.

In order to facilitate understanding, reference will be had to the appended flow sheet which diagrammatically illustrates the apparatus which may be used and the sequence of steps employed in performing the process.

The mixture of ceramic ingredients which is preferably used in the manufacture of strong, dense, non-absorptive, pimply-surfaced granules is preferably high in silica. It has been found that ceramic body mixtures containing more than about 73% silica (dry basis) more positively insure the formation of granules having the desired surface texture, strength, etc. These ceramic mixtures may be compounded from any desired raw materials used in the ceramic industries such as, for example, flint, feldspar, etc. Mixtures of syenite or nepheline with silica or highly siliceous flints can be used. The presence of the high silica content can be attained since it is not necessary that the ceramic body be plastic. Actually, ceramic bodies containing 80% or more of silica can be used effectively, these bodies being so highly siliceous and the content of plastic clays so low as to render their use impossible in prior methods which require extrusion through molding machines or the formation of unburned or molded pellets. A material which has been used with great success in the method of this invention is a porphyritic rhyolite containing over 78% of silica and almost 13% of alumina, potassium and sodium oxides amounting to about 7.3%.

The raw materials may be ground or preliminarily crushed as, for example, in a suitable crusher 10 and then fed to a ball mill 11 with a quantity of water sufficient to form a slurry. The grinding is continued until all of the raw body solids will pass through a 50 or 60 mesh sieve and approximately 80% or 90% will pass over a 150 or 200 mesh sieve. This slurry is passed over a screen 12, coarse material being returned to the ball mill as indicated at 13. The finely divided solids in the form of a slurry are sent to a storage tank or tanks 14.

During operation of the process slurry from the storage tanks 14 is sent to a blunger or tank 15 provided with suitable agitators. The slurry may be diluted at this point to a desired extent by the addition of water and in the event colored granules are to be made, a suitable coloring material, metallic oxide or substance capable of forming an oxide upon firing is mixed with the slurry at this point. The slurry discharged from the blunger 15 may contain from 35% to 65% of water. It has been discovered that by regulating the water content of the slurry at this point the average size of the vitrified granule discharged from the rotary kiln in which the material is burned can be controlled within limits. Ordinarily, however, the slurry contains from 40% to 60% of water. When 65% of water is used, the output of the plant is lower. When 35% of water is used in the slurry, some mechanical difficulties in pumping and handling of certain slurries may be encountered. Ordinarily, however, it may be generally stated that slurries of higher water content will produce smaller granules than slurries of low water content, and the limits given are those customarily found to embrace the usual working range, although at times conditions may permit a wider, economically useful range.

This slurry is then sent into the feed end of a rotary kiln 16 so that a pool of liquid slurry is formed in the feed end of the kiln 16. The zone in which liquid slurry exists in the kiln 16 is indicated at A. The kiln 16 is fired with an oxidizing or reducing flame, the flame extending some appreciable distance into the kiln from the fire end. A more detailed description of what takes place in the rotary kiln 16 will be given hereinafter, for the present it being sufficient to state that a granular vitrified ceramic product is discharged from the lower or fire end of the kiln. This granular product is then passed through a rotating cooler 17 and discharged into storage bins 18. From these storage bins 18 the material is sent through a breaker mill 19 associated with a screen 20, all oversize being returned to the mill as indicated by the line 21. The partly crushed product is then passed over a series of screens 22, 23, 24, 25, etc., the oversize from each screen being sent to storage bins 26, 27, 28, 29, etc. For certain uses the uncrushed, granular product is preferred.

These screens 22 to 25 inclusive are designed to discharge granular products of a narrow variation in average particle size, into the storage bins 26 to 29 inclusive. For example, the granular product may be passed through 2, 4, 8, 14, 20 and 40 mesh sieves, respectively, the material passing through the preceding and left on the subsequent screen being discharged into a storage bin. The fine material passing through the last screen of the series (in the event it is too fine for other use) may be returned as indicated by the line 30, to the blunger 15, for reuse in the process, this fine dust-like material being then utilized in the formation of additional granules of desired size.

Since the granular products of this invention are capable of being used in a great variety of ways, the segregation into lots or portions of substantially uniform particle size is highly desirable. When it is desired to ship granules of a particular size they may be discharged from a desired storage bin onto a continuous conveyor 31 leading to an oiler 32. The oiler 32 is in effect a small rotary kiln supplied with only sufficient heat to warm the granular material passing therethrough. A minute spray of oil is applied to the granular material as it enters the oiler 32, the oil being preferably a non-volatile, high boiling point oil. This oil, under the effect of the heat and the agitation within the oiler 32, is uniformly distributed over the surfaces of the granular material. The oiled material is then discharged as indicated at 33 and is either shipped in bulk or bagged. When it is desired that the material shipped comprise a particular graded aggregate of vitreous particles, the classified particles from the various storage bins 26 to 29 may be discharged upon the conveyor 31 by the use of proportionating feeders 36, 37, 38 and 39, these proportionating feeders discharging desired amounts of particles from each of the bins onto the conveyor 31, the particles being then intimately mixed in the oiler 32.

It has been stated hereinabove that the feed end of the kiln 16 includes a zone A in which there exists a pool of liquid slurry. This is followed by a section or zone B in which the material is passed through an intermediate or large mass stage, emerging into the zone C in which the material now assumes the form of pellets, the size of these pellets being governed somewhat by the proportion of water present in the original slurry fed to the kiln. The nearer the large mass state approaches the high temperature zone, the smaller the size of the discharged pellets. Ordinarily, these pellets may average about ¼ inch in size, or they may be caused to be ½ inch in size on the average, or they may be caused to be ¾ inch in size. Usually pellets larger than about ¾ inch in average dimension are not desired.

It is to be understood that when the pellets are said to average ½ inch in size, the product actually discharged from the kiln may include small particles from the size of a pinhead to particles 1½ inches in diameter but that the average dimension appears to be in the neighborhood of about ½ inch and a relatively large proportion of the material is actually composed of pellets or granules of about ½ inch in mean dimension. The precise location of the zone C where pellet formation takes place will vary along the kiln length with the size of the pellets being formed and the amount of water contained in the slurry fed to the kiln. Generally stated, however, it may be said that the zone C is located in the central section of the kiln. The pellets thus formed in the kiln 16 then pass into the zone D where they are burned to substantial vitrification. The ceramic ingredients used in making the slurry are highly siliceous and at all times are characterized by a long maturing range, i. e., they reach maturity gradually and do not have a sharp or narrow fusion temperature zone. This is one of the reasons which permits the pellets to be burned to virtually complete vitrification without causing coalescence between the individual pellets. Some temporary agglomeration may take place as the product nears the discharge end of the kiln but relatively large quantities of cooling air are admitted around the burner and through the discharge throat of the kiln and these loose agglomerates are readily broken up. The zone which appears to be influenced by the incoming cool air is indicated at E.

A long flame is ordinarily used, the flame (in kilns of 50 to 100 feet length) extending a distance of about ⅓ to ⅕ of the kiln length into the kiln so that the tip of the flame is well in the zone D.

Even though some loose agglomerates may be discharged from the kiln 16, these agglomerates are readily broken apart in the rotating cooler 17 which is preferably provided with flights. As in all commercial operations, there are incidental lumps which are formed but their occurrence is minor and negligible.

As an example of actual operation, a kiln 60 feet long having an inside diameter of 4 feet, was employed, the temperature being about 2350° F., the flame extending a distance of about 18 feet into the kiln. The slurry used was made from a porphyritic rhyolite which per se vitrifies at about cone 7 or 8 and goes down at cone 12. This material, in the form of a vitrified body or pellet, had a modulus of rupture of about 11,000 pounds. A slurry containing 60% of water and ½% to 1% of a metallic oxide by weight of the solids was introduced into the kiln. The kiln was rotated at 1.5 R. P. M. and 2 tons of finished product per hour were obtained. The time of residence in the kiln was about 45 minutes. The general range of variation of residence time is from about 40 minutes to 1 hour and 10 minutes. The discharge gas temperatures at the feed end of the kiln were about 800° F. The dust loss in the discharge or stack gases is negligible.

The temperature of 2350° F. mentioned specifically and the preferred temperature range of about 2150° F. to about 2550° F. refers to the temperature of the material upon which the flame impinges, and such temperatures are virtually the highest in the kiln with the exception of actual flame temperatures.

Since control of the water content of the slurry regulates the average size of particles produced, a material proportion of the final product remains uncrushed. The burned product is virtually vitrified and substantially free from those pores and cavities which are caused by entrapped air in molded or extruded ceramic bodies. The uncrushed surfaces of the granules, when examined at a magnification of say 40 to 60 diameters, exhibits a characteristic bumpy, irregular, or pimply surface, these bumps and pimples being relatively numerous but very minute and apparently provided with a continuous, smooth surface. This pimply surface texture appears to be characteristic of granules made in accordance with this process and is of material value in that the granules are rendered capable of intimately and thoroughly bonding with the asphalt, cement and other cementitious materials used in forming roofing, shingles, surface decoration, etc.

I claim:

1. A process of preparing virtually vitrified ceramic particles, comprising forming a slurry of vitrifiable clay in a state of fine division, said clay being substantially free of volatile constituents whereby said clay is capable of forming dense substantially non-absorptive pellets on calcination, continuously feeding the slurry to a rotary kiln and therein continuously calcining the slurry to form virtually vitrified substantially non-absorptive pellets, and controlling the size of the pellets produced in said kiln by varying the percentage of water in the slurry fed to the kiln within a range of between 35 and 65% water by weight.

2. A process of preparing virtually vitrified ceramic pellets, which process comprises forming a liquid slurry of vitrifiable clay and coloring oxide sufficiently free of volatile constituents so as to be capable of forming dense substantially non-absorptive pellets on calcination, continuously feeding said slurry to a rotary kiln, therein continuously calcining the slurry to form the said virtually vitrified ceramic granules, and modifying the size of the pellets produced in said kiln by varying the percentage of water in the slurry fed to the kiln within a range of between 35 to 65% by weight of water.

3. A process of preparing virtually vitrified ceramic granules, which comprises forming a liquid slurry containing a vitrifiable clay sufficiently free of volatile constituents to be capable of forming dense substantially non-absorptive pellets on calcination, continuously calcining said slurry in a rotary kiln wherein said virtually vitrified ceramic granules are produced, continuously discharging the granules of said kiln and crushing the vitrified particles, classifying the crushed particles into portions of narrow variation in size, removing fines from the crushed material and incorporating such fines in the slurry fed to said rotary kiln.

4. A process of preparing virtually vitrified ceramic granules, which process comprises forming a slurry of vitrifiable clay and coloring oxide sufficiently free of volatile constituents so as to be capable of forming dense and substantially non-absorptive pellets on calcination, continuously passing such slurry to a rotary kiln and therein continuously calcining the same to form said virtually vitrified ceramic granules, continuously discharging the ceramic granules from said kiln, crushing the vitrified granules and classifying the crushed particles into portions of narrow variation in size, removing the fines from the crushed particles, and returning such fines to the slurry fed to said kiln.

5. A process of preparing virtually vitrified ceramic granules, which comprises forming a liquid slurry containing a vitrifiable clay capable on calcination of forming dense substantially non-absorptive pellets, continuously feeding said slurry to a rotary kiln and therein continuously calcining the same to form said pellets, controlling the particle size of the pellets discharged from said kiln by varying the water content of the slurry fed to said kiln, removing the pellets from the kiln, crushing the pellets and separating from the crushed material granules of the desired size, and returning the fines to the slurry fed to said kiln.

JOHN J. STANKO.